(12) United States Patent
Tardy et al.

(10) Patent No.: US 10,297,357 B2
(45) Date of Patent: May 21, 2019

(54) STORAGE DEVICE FOR STORING AND/OR TRANSPORTING NUCLEAR FUEL ASSEMBLIES

(71) Applicant: TN INTERNATIONAL, Montigney le Bretonneux (FR)

(72) Inventors: Marcel Tardy, Paris (FR); Stéphane Brut, Le Chesnay (FR); Nasser Zahri, Saint Gratien (FR)

(73) Assignee: TN INTERNATIONAL, Montigney le Bretonneux (FR)

( * ) Notice: Subject to any disclaimer, the term of this patent is extended or adjusted under 35 U.S.C. 154(b) by 0 days.

(21) Appl. No.: 15/758,588

(22) PCT Filed: Sep. 8, 2016

(86) PCT No.: PCT/EP2016/071220
§ 371 (c)(1),
(2) Date: Mar. 8, 2018

(87) PCT Pub. No.: WO2017/042288
PCT Pub. Date: Mar. 16, 2017

(65) Prior Publication Data
US 2018/0308595 A1    Oct. 25, 2018

(30) Foreign Application Priority Data

Sep. 11, 2015 (FR) .................................. 15 58461

(51) Int. Cl.
*G21F 5/02* (2006.01)
*G21F 5/012* (2006.01)
(Continued)

(52) U.S. Cl.
CPC ............. *G21F 5/012* (2013.01); *G21C 19/07* (2013.01); *G21C 19/40* (2013.01)

(58) Field of Classification Search
CPC . G21F 5/00; G21F 5/005; G21F 5/008; G21F 5/012; G21F 5/06; G21F 5/10; G21F 5/12
(Continued)

(56) References Cited

U.S. PATENT DOCUMENTS

| | | | | |
|---|---|---|---|---|
| 4,382,060 A | * | 5/1983 | Holtz | G21C 19/40 250/506.1 |
| 2008/0123798 A1 | * | 5/2008 | Andre | G21C 19/07 376/272 |
| 2013/0322589 A1 | * | 12/2013 | Bracey | G21F 5/008 376/272 |

FOREIGN PATENT DOCUMENTS

| | | |
|---|---|---|
| EP | 1 083 240 A1 | 3/2001 |
| FR | 2 627 622 A1 | 8/1989 |

(Continued)

OTHER PUBLICATIONS

International Search Report for International Application No. PCT/EP2016/071220 dated Nov. 23, 2016.
(Continued)

*Primary Examiner* — Jason L McCormack
(74) *Attorney, Agent, or Firm* — Pearne & Gordon LLP

(57) ABSTRACT

The invention relates to a storage device for storing and/or transporting nuclear fuel assemblies, which includes recesses (2) defined by separating partitions (9) defining first and second recesses (2), the partition comprising: two first walls (22) defining the first and second recesses and made of an aluminium-alloy material which is free of neutron-absorbing elements, and defining therebetween a first inter-wall space (28); two second walls (30) arranged in the first space (28) and made of a material which comprises neutron-absorbing elements, the distance between the inner (36) and outer (34) surfaces of each second wall (30) defining a thickness (e2), and a distance (E) being defined between the
(Continued)

outer surface (34) of each second wall and a median partition plane (20), the values meeting the condition $0.1 \leq e2/E \leq 0.43$.

13 Claims, 4 Drawing Sheets

(51) Int. Cl.
*G21C 19/07* (2006.01)
*G21C 19/40* (2006.01)

(58) Field of Classification Search
USPC ................................. 250/505.1, 506.1, 515.1
See application file for complete search history.

(56) References Cited

FOREIGN PATENT DOCUMENTS

| | | |
|---|---|---|
| FR | 2 650 113 A2 | 1/1991 |
| FR | 2 872 922 A1 | 1/2006 |
| FR | 2 872 955 A1 | 1/2006 |
| JP | 2001-108788 | 4/2001 |
| WO | 2009/058896 A1 | 5/2009 |

OTHER PUBLICATIONS

Preliminary Search Report for French Patent Application 1558461 dated May 12, 2016.

\* cited by examiner

STORAGE DEVICE FOR STORING AND/OR TRANSPORTING NUCLEAR FUEL ASSEMBLIES

TECHNICAL FIELD

The present invention relates to the field of storing and/or transporting PWR (Pressurised Water Reactor) type nuclear fuel assemblies which can be either irradiated (case of UO2 or MOX fuel), or not irradiated when this is MOX fuel.

STATE OF PRIOR ART

Such a device, also called a storage "basket" or "rack", comprises a plurality of adjacent housings each able to receive a nuclear fuel assembly.

This storage device, intended to be housed in a cavity of a package, is designed so as to be capable of simultaneously fulfiling three essential functions, which will be briefly set out below.

These is first the thermal transfer function of the heat released by the fuel assemblies. Generally, aluminium or an alloy thereof is used, because of its proper heat conductivity.

The second function relates to the neutron absorption, and the worry of maintaining the sub-criticality of the storage device when this is loaded with the fuel assemblies. This is made by using neutron absorbing materials, such as boron. Additionally, the sub-criticality can also be ensured by providing spaces likely to be filled with water, for example just inside the partitions forming the housings of the storage device.

Finally, the third essential function relates to the mechanical strength of the device, which is mainly ensured by the presence of structural elements, most frequently made of steel. It is noted that the overall mechanical strength of the device has to be compatible with regulatory safety requirements for transporting/temporarily storing nuclear materials, in particular as regards the so-called "free fall" tests.

In documents FR 2 872 955 and FR 2 650 113, storage baskets are disclosed in which some of the functions are separately ensured, with dissociated elements. In the solutions suggested by these documents, for each partition, the thickness of the aluminium based external walls is set so as to achieve satisfactory heat conductivity performance. This thickness of both external walls depends on the total thickness of the partition, determined beforehand to fulfil package compactness objectives, aiming at housing as many fuel assemblies as possible in a given volume of the cavity of this package.

Then, in the case of a design as described in document FR 2 650 113, the thickness of the walls of neutron absorbing material located between the aluminium walls, as well as the content of these walls of neutron absorbing elements are determined. The purpose is to check the sub-criticality of the pack formed by the package in which the basket as well as the fuel assemblies are located. The criterion search for is usually a criticality factor $K_{eff}+3\sigma$ lower than or equal to 0.95.

For determining these thicknesses, calculations take the case where the package is in a configuration of loading under water into account. The water which is present in the housings of the basket increases the reactivity within the pack. But when water is introduced between the walls of neutron absorbing material equipping the partitions, this enables the efficiency of the neutron absorbing elements to be improved and thus neutron interactions to be reduced between assemblies. Thereby, the partitions play the role of neutron insulation between the housings.

However, with the existing solutions, it turns out to be complicated to find a dimensioning resulting in a satisfactory compromise in terms of overall mass and costs. Indeed, an increase in the thickness of the walls of neutron absorbing material appears as the solution to decrease the content of neutron absorbing elements in these walls, and thus to reduce costs thereof. However, this is strongly detrimental to the overall mass of the basket, without substantially decreasing the necessary content of neutron absorbing elements to fulfil the sub-criticality criterion. To achieve satisfactory contents of neutron absorbing elements, largely overdimensioned wall thicknesses should be provided, which are incompatible with package operating requirements.

DISCLOSURE OF THE INVENTION

Thus, the invention has the purpose to at least partially overcome the abovementioned drawbacks, relating to the embodiments of prior art.

To do this, the invention has the object to provide a storage device for temporarily storing and/or transporting PWR type nuclear fuel assemblies, said device being intended to be housed in the cavity of a package and including a plurality of adjacent housings each intended to receive a nuclear fuel assembly, the housings being delimited by separating partitions at least one of which delimits on either side of the same a first housing and a second housing of the fuel assembly.

According to the invention, said partition comprises:
two first walls each partly delimiting, respectively with its external surface, said first and second housings, both first walls being made of a first material of aluminium alloy free of neutron absorbing elements, both first walls delimiting a first inter-wall space therebetween;
two second walls arranged in the first inter-wall space and made of a second material comprising neutron absorbing elements and distinct from the first material, each second wall having an external surface facing one of both first walls, as well as an internal surface arranged such that both internal surfaces of both second walls are facing each other and delimit a second inter-wall space therebetween, the distance between the internal and external surfaces of each second wall defining a thickness e2, whereas a distance E is defined between the external surface of each second wall and a median partition plane parallel to the first and second walls, the thickness e2 and the distance E meeting the following condition:

$$0.1 \le e2/E \le 0.43.$$

Surprisingly, this particular dimensioning enables a satisfactory sub-criticality function to be ensured while limiting:
the volume/mass of the second walls, which turns out to be beneficial to fulfil operating requirements;
the volume content of neutron absorbing elements in the second material, thus limiting purchase cost/production costs of the second walls;
the total amount of neutron absorbing elements, for a substantial financial saving;
a difficulty in qualifying the constituent elements, which also results in a financial saving;
the costs of the first walls, which are elements that are conventional, common in industry;

difficulties in achieving proper heat transfer characteristics for the first walls, because they are free of neutron absorbing elements.

In other words, the invention shows the existence of a restricted partition dimensioning range, enabling all the above-mentioned advantages to be achieved. In this regard, it is noted that it is known the existence of a strong interaction between the amount of hydrogen atoms located in the water gap intended to be introduced in the second inter-wall space under loading/unloading conditions (these atoms directly contributing to neutron moderation), and the amount of neutron absorbing elements in the second walls, for the purpose of absorbing neutrons after they have been moderated by the water gap. However, no element of prior art would make it possible to predict the existence of such a narrow dimensioning range, fulfiling all the imposed criteria satisfactorily.

On the other hand, the invention has at least any of the following optional characteristics, taken alone or in combination.

To obtain an even more efficient compromise, the thickness e2 and the distance E meet the following condition:

$$0.15 \leq e2/E \leq 0.32.$$

The distance E is between 20 and 30 mm.

The second material comprises neutron absorbing elements chosen from boron and cadmium, even if other neutron absorbing elements can be contemplated, without departing from the scope of the invention.

Each second wall is pressed against the first associated wall, taking for example the form of a coating deposited onto the internal surface of the first wall.

Alternatively, a clearance J is present between each second wall and the first associated wall, the clearance J being between 1 and 5 mm. This range of values provides an efficiency for the drying between the two walls, once the package is drained off.

The storage device has a number of housings between four and twenty-four housings, each housing being intended to receive a nuclear fuel assembly.

At least one of the housings has a quadrilateral shaped cross-section.

At least some of said partitions are made using notched structural assemblies, the structural assemblies being interlaced and stacked along a stacking direction parallel to the axes of the housings.

Alternatively, at least some of said partitions are partly made using tubular elements each internally defining one of said housings, the walls of these tubular elements making up said first walls of the partitions. In this alternative, the second walls are externally secured to the tubular elements.

The invention has also the object to provide a package for temporarily storing and/or transporting PWR type nuclear fuel assemblies, the package comprising a cavity in which a storage device as described above is housed.

Finally, the invention has the object to provide a pack comprising such a package as well as fuel assemblies arranged in the housings of the storage device of this package.

Further advantages and characteristics of the invention will appear in the non-limiting detailed description below.

BRIEF DESCRIPTION OF THE DRAWINGS

This description will be made with regard to the appended drawings in which.

DETAILED DESCRIPTION OF PREFERRED EMBODIMENTS

Figure 1:
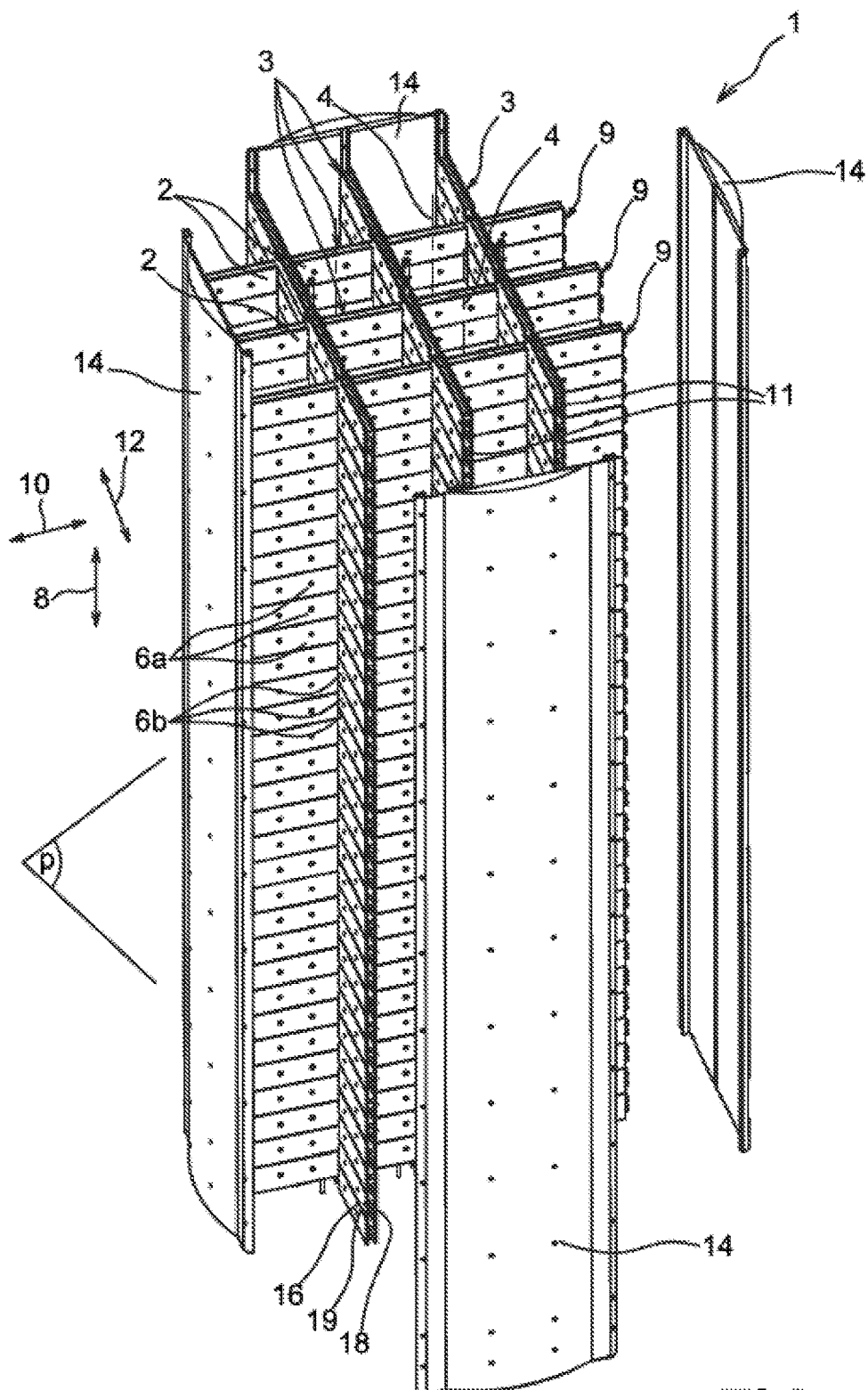
FIG. 1 represents a perspective view of a storage device for temporarily storing and/or transporting nuclear fuel assemblies, according to the present invention.
Figure 2:
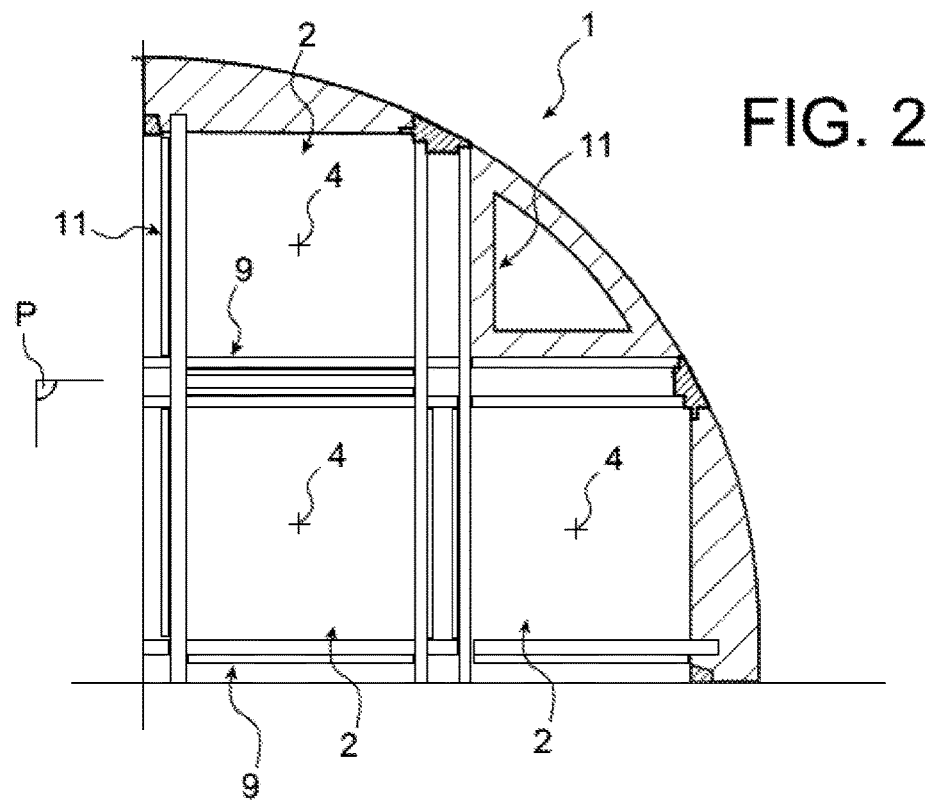
FIG. 2 is a partial cross-section view taken along the transverse plane P of FIG. 1.

In reference to FIGS. 1 and 2, a storage device 1 is represented, provided to be placed in the cavity of a package (not represented) for transporting and/or temporarily storing PWR type irradiated nuclear fuel assemblies (not represented). Conventionally, when the package receives the storage device 1 and that this is loaded with irradiated fuel assemblies, all of these elements form a pack, which is also an object of the invention.

As is visible in FIGS. 1 and 2, the storage device 1 comprises a plurality of adjacent housings 2 disposed in parallel, the latter each extending along a longitudinal axis 4. The housings 2 are each capable of receiving at least one square cross-section fuel assembly, and preferably a single one. The housings are provided in a number between four and twenty-four, for example twelve housings as in FIG. 1.

The housings 2 are thus provided so as to be juxtaposed to each other. They are made through a plurality of separating partitions 9, 11 parallel to the axes 4, and also parallel to a longitudinal axis of the package passing through its bottom and its lid. The partitions 9, 11 are formed using notched structural assemblies 6a, 6b, stacked along a stacking direction 8 which is preferably parallel to the longitudinal axes 4 of the housings 2. By convention, in the following of the description, it is assumed that the notion of "height" is to be associated with the stacking direction 8.

The partitions 9, 11 are arranged parallel and perpendicular to each other, such that the assemblies 6a are located parallel to each other, whereas the assemblies 6b are also located parallel to each other, but perpendicular to the assemblies 6a.

When the structural assemblies 6a, 6b are stacked along the stacking direction 8, the partitions 9, 11 resulting therefrom delimit together the housings 2, each having a substantially square shaped transverse cross-section. Of course, the housings 2 could have any other shape allowing a differently shaped fuel assembly to be held, such as a hexagonal shape.

In the storage device 1 represented in FIGS. 1 and 2 where the housings 2 are of a square cross-section, the structural assemblies 6a form separating partitions 9 parallel to a direction 10, whereas the structural assemblies 6b form separating partitions 11 parallel to a direction 12, the directions 8, 10 and 12 being perpendicular to each other.

Preferably, each of the assemblies 6a, 6b extends between two peripheral partitions 14 to which it is secured, these peripheral partitions 14 enabling the storage device 1 to be closed sideways. By way of indicating example and as represented, these peripheral partitions 14 can be provided four in number, each extending on the entire height of the device 1, and partly delimiting the peripheral housings 2 of this device 1.

Figure 3:
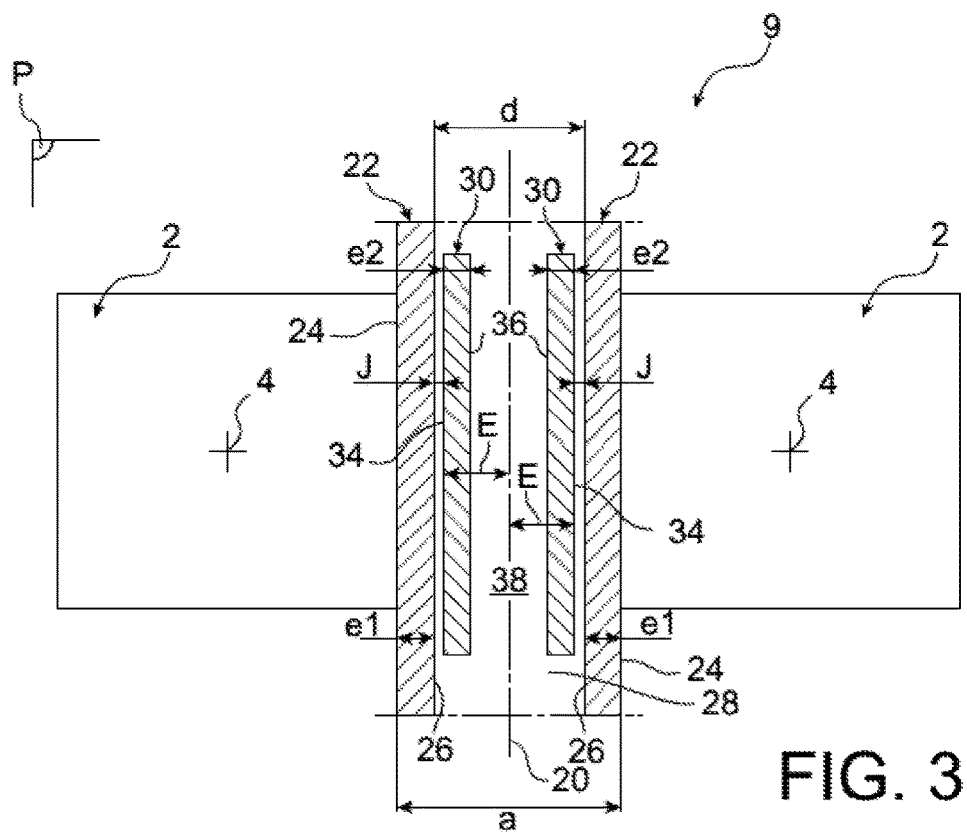
FIG. 3 represents a transverse cross-section view of a partition of the storage device shown in FIG. 2.

On the other hand, as is clearly apparent from the above, the partitions 9, 11 participate in delimiting several housings 2 on either side of the same. In this regard, FIG. 3 shows a part of one of the separating partitions 9, delimiting on either side of the same a first housing 2 as well as a second housing 2, their two axes 4 being located in a dummy plane orthogonal to that of the partition 9. Only two housings 2 are represented in FIG. 3, but as previously mentioned, it is to be understood that this partition 9 is preferably provided to delimit one or more other housings 2 on either side of the same. The partition 9 of FIG. 3 will now be described in more detail, and it is to be considered that the other partitions 9, as well as the abovementioned partitions 11, have an identical or similar design.

The partition 9 has a symmetry along a median plane 20 orthogonal to the transverse plane P of FIG. 1. On each side of this plane 20, the partition 9 includes a first wall 22 parallel to the median plane 20, and comprising an external surface 24 as well as an internal surface 26. The external surface 24 partly delimits the associated housing 2, whereas the two internal surfaces 26 of both walls 22 delimit a first inter-wall space 28 therebetween.

The first walls 22 are made of an aluminium alloy free of neutron absorbing elements. It is indicated that by neutron absorbing elements, it is meant elements which have an effective cross-section higher than 100 barns for the thermal neutrons. By way of indicating examples, this is an aluminium alloy free of boron, gadolinium, hafnium, cadmium, indium, etc.

In the case of a design with stacked and interlaced notched assemblies, each first wall 22 is thus segmented along the height direction of the device 1.

The thickness e1 of each first wall 22 is for example between 5 and 25 mm, whereas the distance "a" separating both external surfaces 24 is in the order of 40 to 100 mm, whereas the distance "d" separating both internal surfaces 26 is in the order of 30 to 60 mm.

In the first inter-wall space 28, with each first wall 22, a second wall 30 parallel to the median plane 20 is associated. Each wall 30 comprises an external surface 34 as well as an internal surface 36. The external surface 34 faces the internal surface 26 of its first associative wall, whereas both internal surfaces 36 face each other and delimit a second inter-wall space 38 therebetween.

The second walls 30 are made of a second material comprising neutron absorbing elements, for example an alloy comprising boron carbide ($B_4C$), preferably an aluminium based alloy.

In the case of a design with stacked and interlaced notched assemblies, each second wall 22 is also segmented along the height direction of the device 1.

In the embodiment exhibited in FIG. 3, a clearance J is provided between the internal surface 26 and the external surface 34 facing it. This clearance J is for example between 1 and 5 mm, so as to provide a proper drying efficiency between both walls 22, 30, once the package is drained off. Alternatively, the second wall 30 can be pressed against the internal surface 26 of its first associated wall, so as to limit water infiltrations. To do this, a technique of depositing the second wall 30 onto the first wall 22 can be implemented, for example such that the latter takes the form of a coating deposited onto the internal surface 26. For example, this can be a composite comprising a particle loaded metal matrix comprising neutron absorbing elements.

The thickness e2 of each first wall 22 is for example between 2 and 10 mm, whereas the distance "E" separating the external surface 34 from the median plane 20 is for example between 15 and 40 mm, and further preferentially between 20 and 30 mm.

One the features of the invention lies in the choice of the dimensions for the thickness e2 and the distance E, such that they satisfy the condition $0.1 \leq e2/E \leq 0.43$, and more preferentially $0.15 \leq e2/E \leq 0.32$, corresponding to the case where E is 23.5 mm and e2 values for which $Keff+3\sigma$ is satisfied with a maximum content of boron carbide ($B_4C$) of 25%.

Indeed, it has been noticed that these ranges of dimension ratios advantageously result in partitions satisfying cost, mass and sub-criticality criteria.

Figure 4:
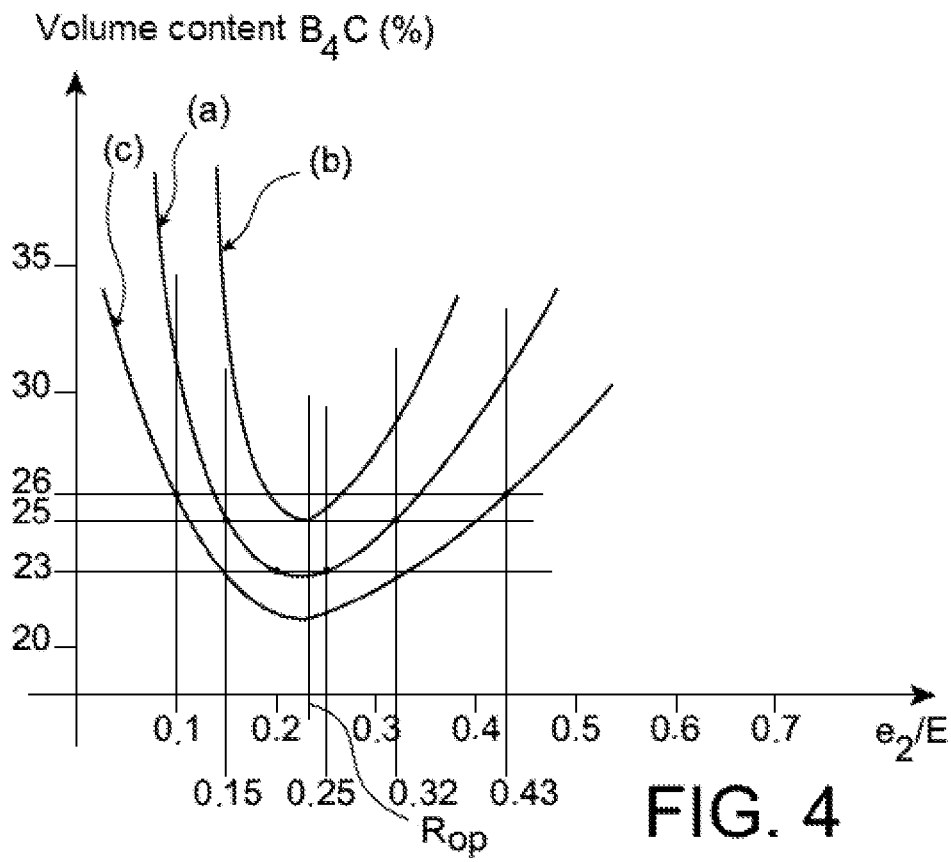
FIG. 4 is a graph comprising three curves showing the content of boron carbide in the second walls of the partition, as a function of a ratio of dimensions associated with these second walls.

In reference to FIG. 4 now, it is shown a graph in which the curves (a) and (b) and (c) represent, as a function of the ratio e2/E, the volume content of boron carbide in an aluminium alloy required for achieving a criticality factor $Keff+3\sigma$ of a 0.95 value.

For curve (a), the distance E is set to 23.5 mm, whereas for curve (b), the distance E is set to 20 mm, and for curve (c), the distance E is set to 30 mm.

Surprisingly, these curves show that for e2/E ratios between 0.1 and 0.43, the volume content of boron carbide sufficient to satisfy the sub-criticality criterion does not exceed 26%, which enables the second walls 30 to be manufactured at a reasonable cost.

Further surprisingly, these curves show that the minimum content to satisfy the sub-criticality criterion corresponds to an identical e2/E ratio regardless of the E value, this optimum ratio Rop being substantially equal to 0.23. The three curves are thus axially offset, along the ordinate axis corresponding to the content of boron carbide. The higher is the E value, the lower is the required volume content of boron carbide, and reversely.

This content is even reduced to around 25% when the e2/E ratio is 0.23, and E values higher than 20.

For E values higher than or equal to 23.5 mm, this content is further reduced to less than 23% when the e2/E ratio is set between 0.2 and 0.25.

Figure 5A:
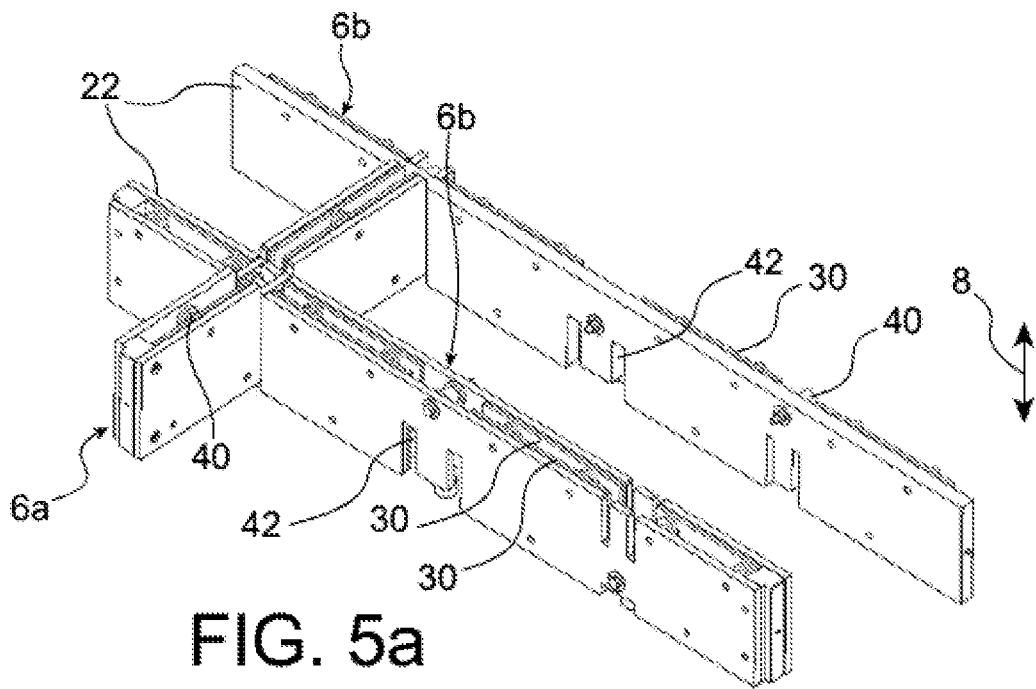
FIGS. 5a and 5b show a first possible design for the partitions of the storage device.
Figure 5B:
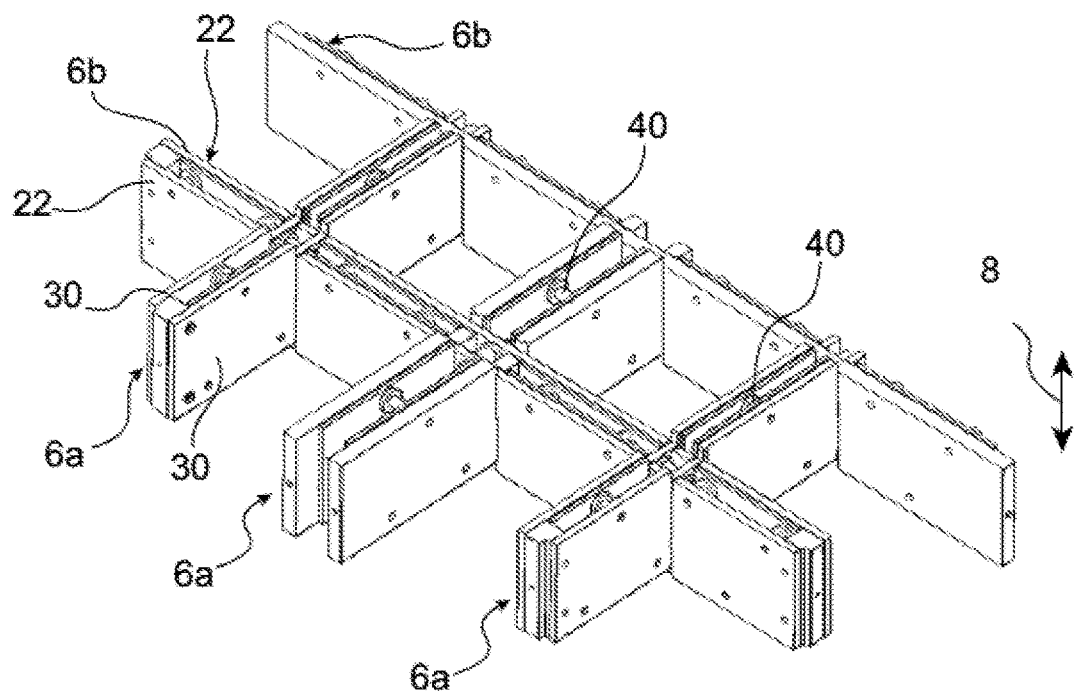

In reference now to FIGS. 5a and 5b, the assemblies 6a, 6b for forming the partitions 9, 11 are shown, in two distinct configurations upon assembling. These assemblies 6a, 6b each have spacers 40 separating the two second walls 30. They are equipped with notches 42 made at the first walls 22, so as to allow assembling by stacking and interlacing, in the way described in document FR 2 872 922. In addition, it is indicated that the second walls 22 do not extend at the interlaced portions, such that they are interrupted along each assembly 6a, 6b. This enables a financial saving to be generated, without embrittling the sub-criticality criterion insofar as the interlaced zones have only a low on the criticality factor.

Figure 6:
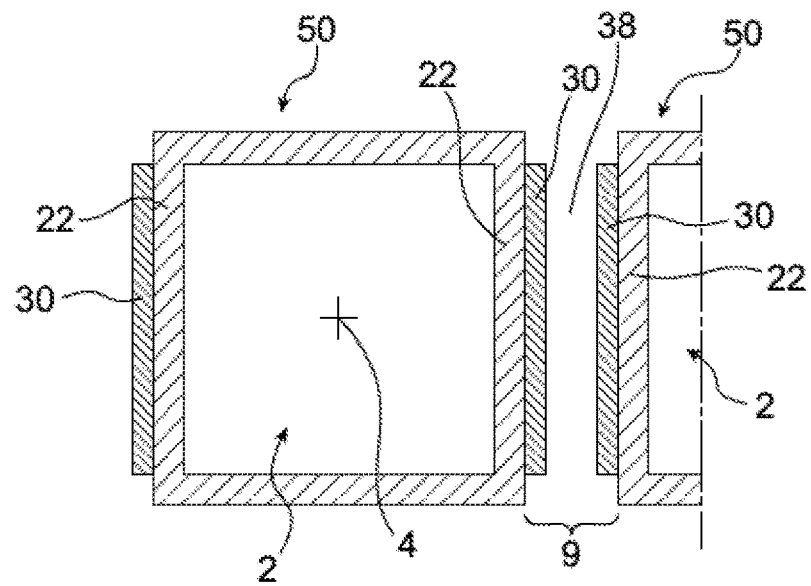
FIG. 6 represents a second possible design for partitions of the storage device.

According to another embodiment shown in FIG. 6, square transverse cross-section tubular elements 50 are provided, each defining one of the housings 2. All or only some of the four walls of a tubular element 50 form the first walls 22, which are externally coated with a second wall 30. The partition 9 is thereby formed by the facing parts of two adjacent tubes 50.

Of course, various modifications could be provided by those skilled in the art to the storage devices 1 just described, only by way of non-limiting examples.

What is claimed is:

1. A storage device for temporarily storing and/or transporting PWR type nuclear fuel assemblies, said device being intended to be housed in a cavity of a package and including a plurality of adjacent housings each intended to receive a nuclear fuel assembly, the housings being delimited by separating partitions at least one of which delimits on either side of the same first and second housings, wherein said at least one separating partition includes:

two first walls each partly delimiting, respectively with its external surface, said first and second housings, both first walls being made of a first material of aluminium alloy free of neutron absorbing elements, both first walls delimiting a first inter-wall space therebetween;

two second walls arranged in the first inter-wall space and made of a second material comprising neutron absorbing elements and distinct from the first material, each second wall having an external surface facing one of both first walls, as well as an internal surface arranged such that both internal surfaces of both second walls are facing each other and delimit a second inter-wall space therebetween, the distance between the internal and external surfaces of each second wall defining a thickness ($e2$), whereas a distance ($E$) is defined between the external surface of each second wall and a median partition plane parallel to the first and second walls, said device being also characterised in that the thickness ($e2$) and the distance ($E$) meet the following condition:

$1 \leq e2/E \leq 0.43$.

2. The storage device according to claim 1, wherein the thickness ($e2$) and the distance ($E$) meet the following condition:

$0.15 \leq e2/E \leq 0.32$.

3. The storage device according to claim 1, wherein the distance ($E$) is between 20 and 30 mm.

4. The storage device according to claim 1, wherein the second material comprises neutron absorbing elements chosen from boron and cadmium.

5. The storage device according to claim 1, wherein each second wall is pressed against the first associated wall, taking the form of a coating deposited onto the internal surface of the first wall.

6. The storage device according to claim 1, wherein a clearance ($J$) is present between each second wall and the first associated wall, the clearance ($J$) being between 1 and 5 mm.

7. The storage device according to claim 1, wherein it has a number of housings between four and twenty-four housings, each housing being intended to receive a nuclear fuel assembly.

8. The storage device according to claim 1, wherein at least one of the housings has a quadrilateral shaped cross-section.

9. The storage device according to claim 1, wherein at least some of said partitions are made using notched structural assemblies, the structural assemblies being interlaced and stacked along a stacking direction parallel to the axes of the housings.

10. The storage device according to claim 1, wherein at least some of said partitions are partly made using tubular elements each internally defining one of said housings, the walls of these tubular elements making up said first walls of the partitions.

11. The storage device according to claim 10, wherein the second walls are externally secured to the tubular elements.

12. A package for temporarily storing and/or transporting PWR type nuclear fuel assemblies, the package comprising a cavity in which a storage device according to claim 1 is housed.

13. A pack comprising a package according to claim 12 as well as fuel assemblies arranged in the housings of the storage device of this package.

* * * * *